United States Patent [19]

Linton

[11] Patent Number: 4,521,060
[45] Date of Patent: Jun. 4, 1985

[54] HYDRAULIC ASYMMETRY DETECTOR

[75] Inventor: David J. Linton, Rockford, Ill.

[73] Assignee: Sundstrand Corporation, Rockford, Ill.

[21] Appl. No.: 553,743

[22] Filed: Nov. 17, 1983

[51] Int. Cl.$^3$ ............................................. B60T 13/22
[52] U.S. Cl. .................................. 303/71; 188/170; 244/111
[58] Field of Search ............... 303/1, 6 R, 6 M, 71, 303/13, 98; 188/382, 170, 152, 105; 60/486, 721; 244/111

[56] References Cited

U.S. PATENT DOCUMENTS

| | | | |
|---|---|---|---|
| 2,597,420 | 5/1952 | Westbury | 60/53 |
| 2,717,745 | 9/1955 | Carter | 244/111 |
| 2,926,497 | 3/1960 | Biernath | 60/52 |
| 3,456,988 | 7/1969 | Gibbons et al. | 303/71 X |

*Primary Examiner*—Douglas C. Butler
*Attorney, Agent, or Firm*—Wood, Dalton, Phillips, Mason & Rowe

[57] ABSTRACT

A hydraulic asymmetry detector for sensing differential movement of a pair of flight control surfaces, such as the wing flaps of an aircraft, which are actuable by actuating mechanisms. The detector has a pressure-regulator valve and a sensor valve, with the pressure-regulator valve operable in response to movement of one actuating mechanism to set a control pressure proportional thereto, and the sensor valve has a valve member which senses a force balance between a force created by the control pressure and a force which is proportional to the movement of the other actuating mechanism. The sensor valve member moves with a snap action when there is a force imbalance to result in setting one or more brakes for the actuating mechanisms to lock the actuating mechanisms and thereby limit the asymmetric condition within a manageable range.

14 Claims, 3 Drawing Figures

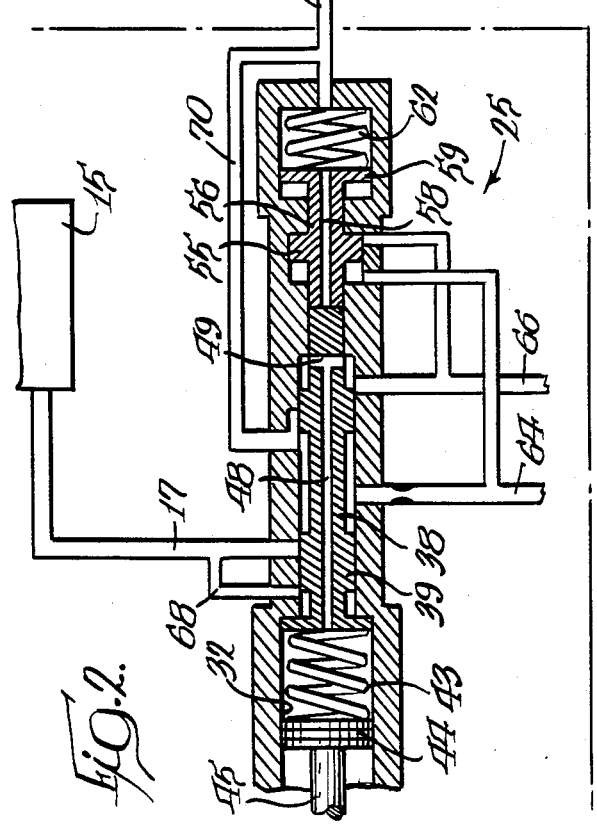
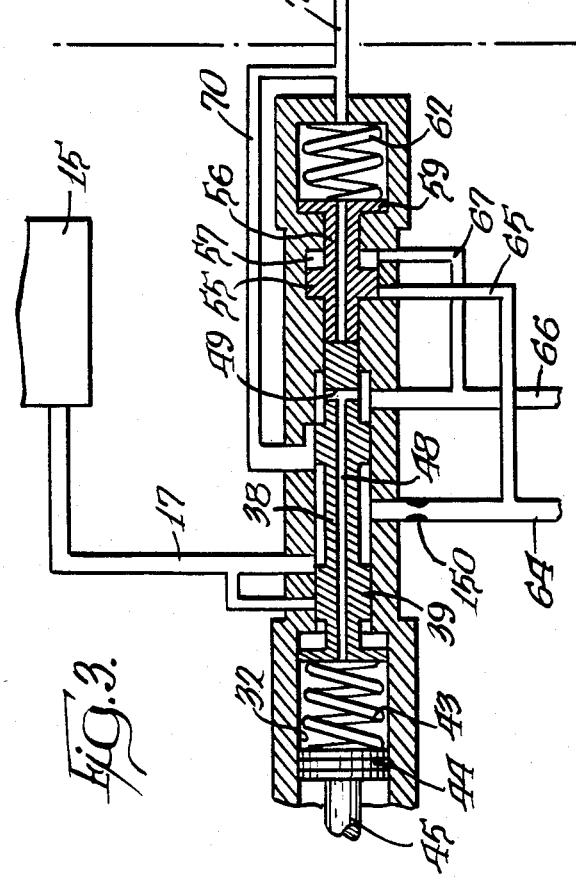

HYDRAULIC ASYMMETRY DETECTOR

DESCRIPTION

Technical Field

This invention pertains to a hydraulic asymmetry detector for sensing the inadvertent differential displacement of two movable devices, such as a pair of control surfaces of an aircraft. In the operation of flight control surfaces for an aircraft, such as wing flaps, the hydraulic asymmetry detector detects any asymmetric movement thereof and, upon sensing the asymmetric motion, operates to disable the system, locking the flight control surfaces in place and thereby limiting the asymmetric condition within a manageable range.

Background Art

In operation of an aircraft, it is necessary to have synchronous movement of control surfaces, such as the wing flaps on opposite sides of the aircraft. Asymmetric deployment of the control surfaces causes an imbalance in the lift forces applied to the opposite sides of the aircraft with resultant problems in safely controlling the flight of the aircraft. A typical actuator system has a drive train with mechanically linked drive connections to flaps at each wing wherein the flaps may be advanced or retracted relative to the wings through the use of one or more mechanisms powered by the drive train. Sensing the relative positions of the flight control surfaces and braking the drive train against further movement of the control surfaces when the positions of the control surfaces start to become asymmetric is known in the prior art. That system does not operate as effectively as a system which detects differential movement.

Disclosure of the Invention

The present invention relates to a hydraulic asymmetry detector which senses any inadvertent differential displacement of mechanically linked or simultaneously driven devices, such as a pair of wing flaps of an aircraft. The hydraulic asymmetry detector is associated with a pair of drive output shafts for driving the aircraft control surfaces, which can be either mechanically interconnected or electronically synchronized and operates quickly to sense asymmetry and to set brakes to lock the output shafts to hold the control surfaces in position before the asymmetric condition becomes so great as to prevent manageable control of the aircraft.

A primary feature of the invention is to provide an asymmetry detector which utilizes hydraulics for quick action and which has a pressure regulator valve for establishing a control pressure proportional to movement of one actuating mechanism for a control surface and a sensor valve for detecting a difference in a force resulting from said control pressure and a force proportional to movement of a second actuating mechanism associated with another control surface and with there being means operable to set a brake to prevent further movement of the actuating mechanisms when asymmetry is detected.

An object of the invention is to provide a hydraulic asymmetry detector for detecting relative movement between a pair of actuating mechanisms for a pair of flight control surfaces of an aircraft and operable to set a brake when asymmetry is detected comprising a pressure-regulator valve for setting a control pressure proportional to movement of one actuating mechanism, a sensor valve having a valve member to which said control pressure is applied to provide a force urging said sensor valve member in one direction, means urging the sensor valve member in the opposite direction with a force proportional to movement of the other actuating mechanism, and means associated with the sensor valve for controlling setting of the brake, with the brake being set when the forces acting on the sensor valve member are out of balance.

Brief Description of the Drawings

FIG. 2 is a view, similar to FIG. 1, showing the components in one position when asymmetry is detected; and FIG. 3 is a view, similar to FIG. 1, showing the components as positioned after the brakes have been set and supply pressure is not available.

Figure 1:
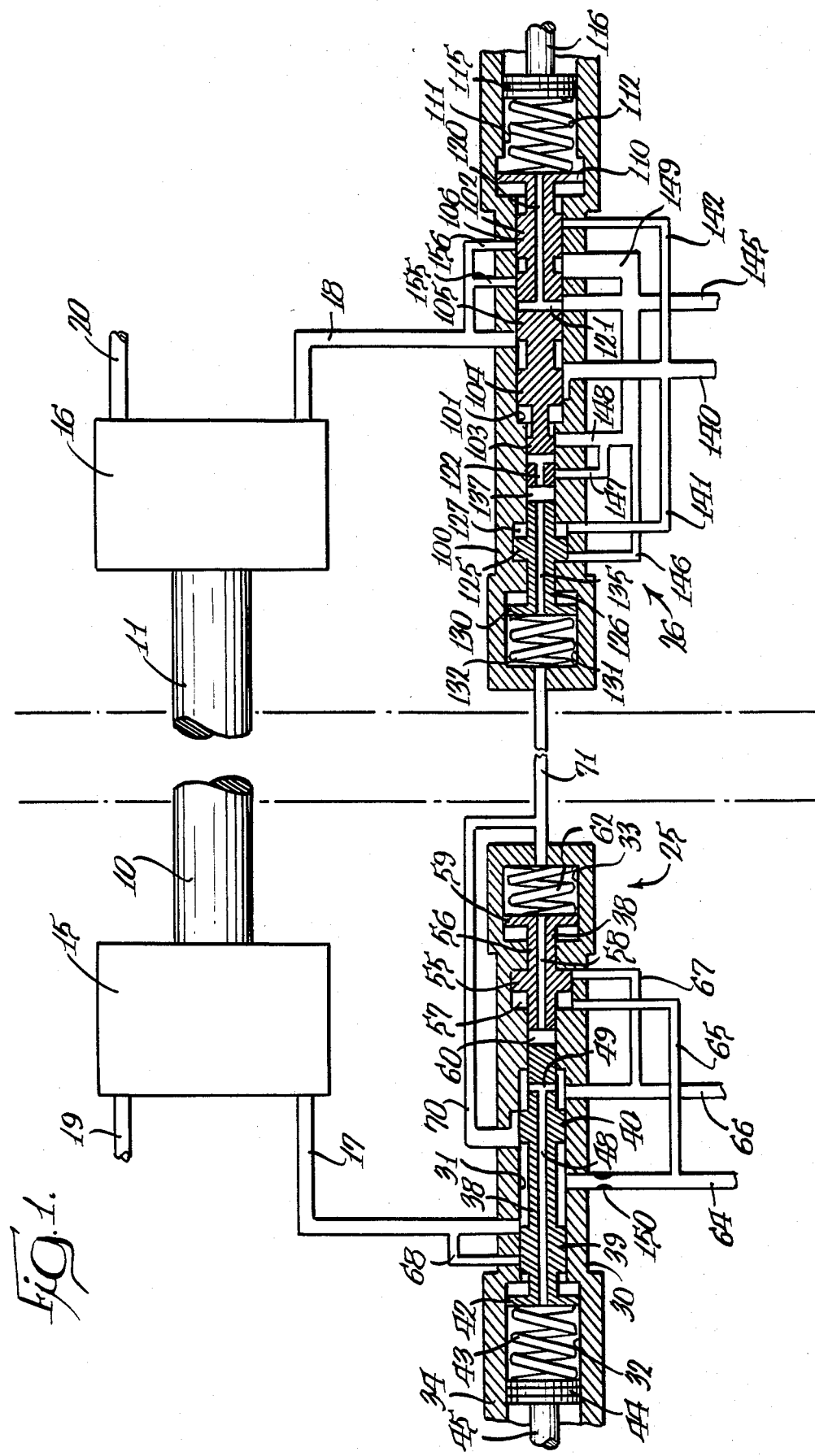
FIG. 1 is a schematic of the hydraulic asymmetry detector with the components shown in a normal operative position.

Best Mode for Carrying Out the Invention

The hydraulic asymmetry detector is shown in FIG. 1 in association with a pair of output shafts 10 and 11 which are output shafts of a pair of actuator mechanisms associated with symmetrical control surfaces of an aircraft, such as the flaps of the aircraft wings. Each of the output shafts 10 and 11 is mechanically connected to the aircraft control surface actuating mechanisms whereby rotation of these output shafts is proportional to the movement of the control surfaces that are being operated.

Each of the output shafts 10 and 11 has a hydraulically operated brake 15 and 16, respectively, associated therewith, with the brakes being normally urged to a set position and being released when hydraulic pressure is applied to the brake. The pressurization of the brake 15 is controlled through a brake line 17 and the pressurization of the brake 16 is controlled through a brake line 18. A redundant hydraulic asymmetry detector (not shown) connects to the brakes 15 and 16 through the brake lines 19 and 20, respectively.

The hydraulic asymmetry detector has a pair of valves which are primary components thereof. One of these valves is a pressure-regulator valve, indicated generally at 25, and the other is a sensor valve, indicated generally at 26.

The pressure-regulator valve 25 has a casing 30 with a central bore 31 extending therethrough and terminating at its opposite ends in a pair of chambers 32 and 33 formed within enlarged ends 34 and 35 of the casing. A valve member 38 is movable within the bore 31 and has a pair of valve lands 39 and 40 intermediate its ends. A flange 42 at an end of the valve member is positioned within the chamber 32 and is engaged by a spring 43 which engages a piston 44 movable in the chamber. The piston 44 has a rod 45 which mechanically connects to a control surface, such as a flap or slat at one side of the aircraft. The spring 43 exerts a force on the flange 42 which increases linearly with the displacement of the piston 44 toward the right as viewed in FIG. 1. The valve member 38 has a central passage 48 extending from the end thereof having the flange 42 to a location adjacent the opposite end where it communicates with a transverse passage 49 extending to the surface of the valve member.

The pressure-regulator valve 25 also has a movable piston 55 positioned within a cylinder 57 formed within the casing 30 of the valve member. A piston rod 56 can move lengthwise of the bore 31. The piston rod 56 has a longitudinal passage 58 extending centrally thereof which extends through a flange 59 at one end of the piston rod and at its other end opens to a space 60 between the valve member 38 and the piston rod 56, with this space existing as the components are positioned as shown in FIG. 1. The flange 59 is movable within the chamber 33, with this chamber housing a spring 62 acting between the flange and an end of the valve member casing.

A hydraulic fluid, such as oil, is supplied to the pressure-regulator valve through a supply line 64 which communicates with the bore 31 of the valve member and a supply line branch 65 which communicates with one end of the cylinder 57. Oil can return from the pressure-regulator valve to a reservoir through a return line 66 which communicates with the bore 31 of the valve member and a return line branch 67 thereof which communicates with the cylinder 57. The brake line 17 extending to the brake 15 communicates with the bore 31 and has a branch line 68 which also communicates with the bore.

A control pressure line 70 communicates with the bore 31 intermediate the ends of the valve casing and communicates with a control pressure line 71 which opens to an end of the chamber 33 and which also extends to the sensor valve 26.

The sensor valve 26 has a valve casing 100 with a central bore 101 having sections of different diameter. A multi-diameter section of the bore mounts a valve member 102 having lands 103, 104, 105, and 106. A flange 110, at one end of the valve member, is positioned within a chamber 111 formed at an end of the valve casing 100. A spring 112 is positioned between the flange 110 and a piston 115 having a rod 116 which is connected to the control surface associated with the output shaft 11 and moves proportional to the movement thereof. The spring 112 exerts a force on the flange 110 which varies linearly with the displacement of the piston 115. An internal passage 120 extends from an end of the valve member having the flange 110 to a position intermediate the ends thereof where it communicates with a transverse passage 121 extending to the surface of the valve member. The valve member 102 also has a central passage 122 opening at its opposite end and extending a short distance through the land 103 and communicating with a transverse passage leading to the surface of the land 103.

The sensor valve 26 also has a piston 125 on a piston rod 126 with the piston movable within a cylinder 127 formed in the valve casing. The piston rod has a flange 130 at an end thereof positioned within a chamber 131 formed at an end of the valve casing 100 and which houses a spring 132 acting between the flange 130 and an end wall of the chamber. The piston has a central passage 135 extending for the length thereof to communicate with the chamber 131 and with a space 137 between adjacent ends of the piston rod and the valve member 102.

The sensor valve is connected to a source of oil under pressure through a supply line 140 which connects to the bore 101 of the valve member in the area of the valve lands 104 and 105. This supply line 140 has a pair of supply line branches 141 and 142, with the supply line branch 141 connecting to an end of the cylinder 127. The supply line branch 142 connects to the valve bore in the area of the valve land 106.

A return line 145 is connectable to a reservoir and extends to the valve bore in the area of the valve land 105. The return line has a number of branches communicating therewith. A return line branch 146 communicates with the cylinder 127. A pair of return line branches 147 and 148 communicate with the valve bore in the area of the valve land 103. A return line branch 149 communicates with the valve bore in the area of the valve lands 105 and 106.

The brake line 18 extends into communication with the valve bore 101 and has a pair of brake branch lines 155 and 156 which also communicate with the valve bore.

The primary purposes of the pressure-regulator valve 25 are to establish a control pressure proportional to movement of the actuating mechanism connected to the rod 45 and to control the release and setting of the brake 15. The primary purposes of the sensor valve are to sense the movement of the actuating mechanism connected to the rod 116 and compare a force established in proportion to that movement with a force exerted by the control pressure and when there is a difference in said force cause setting of the brake 16. This operation of the sensor valve also causes operation of the pressure-regulator valve to set the brake 15.

First referring to normal operation, and with the components positioned as shown in FIG. 1, the piston 44 of the pressure-regulator valve and the piston 115 of the sensor valve move with synchronous motion as their associated aircraft control surfaces extend or retract. Assuming the piston 44 moves to the right, as viewed in FIG. 1, the spring 43 is caused to exert an increasing force on the valve member 38. Supply pressure delivered to the valve bore 31 intermediate the lands 39 and 40 has controlled communication with the control pressure line 70 by coaction between the valve land 40 and the inlet port of the control pressure line. As the valve member 38 is urged toward the right, there will be an increase in the opening to the inlet port of the control pressure line 70 whereby the value of the control pressure increases.

This control pressure is directed through the control pressure line 71 to the chamber 33 and through the passage 58 of the piston rod 56 to the space 60 wherein the control pressure acts on an end of the valve member 38 to oppose the force of the spring 43 and bring the valve member 38 into a force balanced position. At the same time, the control pressure reaches the space 137 in the sensor valve 26 through the chamber 131 and the passage 135 in the piston rod 126. This pressure acts against an end of the land 103 of the sensor valve member, with the passage 122 being blocked, to create a force urging the sensor valve member 102 toward the right, with this movement being opposed by the force exerted by the spring 112. In symmetrical movement, the pistons 44 and 115 move equally and oppositely. The sensor valve member 102 remains centered in the position shown in FIG. 1 so long as there is symmetrical movement of the control surfaces and the pistons 44 and 115, since the forces established by the springs 43 and 112 are equal.

The same operation occurs if the piston 44 moves toward the left as viewed in FIG. 1. The force of spring 43 is reduced and control pressure urges valve member 38 to the left to reduce the control pressure to again obtain a force balance on valve member 38. The reduced control pressure in space 137 of the sensor valve acts against the reduced force of spring 112 as the piston 115 moves to the right.

When there is asymmetric operation of the control surfaces, the pistons 44 and 115 become differentially displaced. Upon this occurrence, the force balance no longer exists at the sensor valve member 102 and the predominant force determines whether the sensor valve member 102 will move toward the right or left as viewed in FIG. 1.

Assuming the piston 44 is moving to the left in FIG. 1 and the piston 115 is moving to the right but there is asymmetry whereby the piston 115 is moving faster than the piston 44, there is a resulting reduction in the control pressure because of the movement of the valve member 38, and less force exerted thereby in space 137 against the valve land 103. This force is still greater than the resisting force exerted by the piston 115 and spring 112 whereby the valve member 102 is caused to move to the right. After a small movement, there is a snap action because of supply pressure in supply line 140 acting against the left-hand end of the valve land 104 and the sensor valve member 102 moves to the right to have the flange 110 engage against a shoulder within the chamber 111. This blocks communication of supply pressure in supply line 140 with the brake line 18. The brake is set because of pressure being relieved therefrom by flow to the return line 145 through the brake branch line 156 which communicates therewith through a groove between the lands 105 and 106.

When the differential movement is such as to have the force exerted by the spring 112 of the sensor valve overcome the force exerted by the control pressure in the space 137, the valve member 102 is caused to shift to the left with a snap action by supply pressure in supply line branch 142 acting against the right-hand end of valve land 106. The sensor valve member 102 is shown in this position in FIG. 2, with the flange 110 against a shoulder in the chamber 111 of the sensor valve member. In this position, the valve land 105 of the sensor valve member blocks communication between supply pressure and the brake line 18 and pressure is relieved from the brake 16 by flow to the return line 145 through brake branch line 155. As will be seen in FIG. 2, the valve member 102 is in abutting relation with the piston 126 and the space 137 no longer exists. As will be noted in FIG. 1, the land 104 has an overlap with the connection of supply line 140 to the valve bore 101 to provide a tolerance band to permit some modulating movement of the sensor valve member without incurring the snap action.

In the position of FIG. 2, the return line branch 147 of the sensor valve 26 connects, through piston 126, with the control pressure lines 70 and 71 to reduce the control pressure whereby the control pressure in the space 60 of the pressure-regulator valve is reduced and the pressure-regulator valve member 38 can shift to the right to the position shown in FIG. 2.

If sensor valve member 102 has shifted to the right, the control pressure bleeds off to the return line through the return line branch 148 and passage 122.

The spring 43 gives a snap action to move the valve member 38 to the FIG. 2 position. This results in the valve land 39 of the pressure-regulator valve member blocking communication between the supply line 64 and the brake line 17 and connecting the branch brake line 68 to the return line 66 by flow into the chamber 32 and through the passage 48 in the valve member and the transverse passage 49. The action of reducing the control pressure causes shift of the pressure-regulator valve member 38 to the right as viewed in the drawings regardless of whether the sensor valve member 102 moves to the right or the left.

From the foregoing, it will be evident that any asymmetric operation of the actuators as detected by differential movement of the pistons 115 and 44 results in release of pressure from the brakes 15 and 16 whereby the brakes are set to lock the actuator systems against further asymmetrical movement.

The hydraulic asymmetry detector can again be placed into use after the malfunction has been corrected and during such time supply pressure will have been cut off from the supply lines 64 and 140 to the pressure-regulator and sensor valves, respectively. In the absence of supply pressure, the springs 62 and 132, which are stronger than springs 43 and 112, act on the flanges 59 and 130 of the pistons 56 and 126 of the pressure-regulator and sensor valves, respectively, to urge the respective pistons to the positions shown in FIG. 3. Since these pistons have been in physical contact with the ends of the valve members 38 and 102, this movement results in moving the valve member 38 to the left to the position shown in FIG. 3 and the valve member 102 to the position shown in FIG. 3. This places the valve members in their centered normal operating position and as previously described in connection with FIG. 1. As supply pressure is connected to the supply lines 64 and 140 and increased, the piston 155 is caused to move to the right by supply pressure through branch line 65 acting on the left-hand face of the piston and with the opposite end of the cylinder 57 being connected to the return line through the return branch line 67. Supply pressure in supply line 140 acts on the piston 125 through the branch supply line 141 to move the piston 125 to the left. As a result of the action of pressure on the pistons 55 and 125, the piston rods are returned to the positions shown in FIG. 1.

With the pressure-regulator valve member 38 being returned to the position of FIG. 1, supply pressure can again flow to the brake line 17 to release the brake 15 and an orifice 150 in the supply line 64 slows down the build-up of the control pressure in control lines 70 and 71. The movement of the sensor valve member 102 to the normal centered position also connects supply pressure at supply line 140 to the brake line 18 to release the brake 16.

It will be evident from the foregoing description that the hydraulic asymmetry detector senses differential movement of a pair of movable actuating mechanisms to set one or more brakes when asymmetry is detected. The asymmetry detector relies upon detection of a force balance, or lack thereof, with the force balance being detected at the sensor valve. The forces that are compared are generated by the movement of the actuating mechanisms, with one actuating mechanism being associated with the pressure-regulator valve to establish a control pressure and the control pressure is utilized at the sensor valve member to create a force which is compared with a spring force generated by movement of the other actuating mechanism. So long as there is a balance of these forces, there is normal operation and the brakes 15 and 16 remain released. Once there is an imbalance in the forces because of asymmetrical movement of the two actuating mechanisms, there is a force imbalance which results in movement of the sensor valve member to set the brake 16 associated therewith and to reduce the control pressure whereby the pressure-regulator valve member shifts to release pressure from the brake 15 and cause setting thereof. The asymmetry detector works during both extension and retraction operation of the actuating mechanisms as used for aircraft wing flaps or slats.

I claim:

1. A hydraulic asymmetry detector for sensing differential movement of a pair of movable interconnected actuating mechanisms and operable to set a brake when asymmetry is detected comprising, a pressure-regulator valve and a sensor valve, means whereby the pressure-regulator valve sets a control pressure proportional to movement of one actuating mechanism, means associated with the sensor valve for detecting a difference in a force resulting from said control pressure and a force proportional to movement of the other actuating mechanism, and means operable to set said brake when said force difference is detected.

2. A hydraulic asymmetry detector for detecting lack of equal movement of two actuating mechanisms comprising, a movable sensor member, means exerting opposing forces on said sensor member with one force proportional to the movement of one actuating mechanism and the other force being proportional to the movement of the other actuating mechanism, said movable sensor member having a normal position when said forces are in balance and movable to another position when said forces are out of balance, and asymmetry-indicating means operable when said sensor member is in the other position.

3. A hydraulic asymmetry detector as defined in claim 2 wherein said force-exerting means includes a pressure-regulator valve for setting a control pressure proportional to movement of one actuating mechanism.

4. A hydraulic asymmetry detector as defined in claim 3 wherein said sensor member is a valve member and said control pressure is applied thereto.

5. A hydraulic asymmetry detector as defined in claim 4 wherein said force-exerting means includes a spring acting on the valve member in opposition to the control pressure, and means for causing said spring to establish a force proportional to movement of the other actuating mechanism.

6. A hydraulic asymmetry detector as defined in claim 3 including a spring acting on the pressure-regulator valve for exerting a force thereon proportional to movement of said one actuating mechanism.

7. A hydraulic asymmetry detector as defined in claim 2 wherein said means exerting opposing forces includes a pressure-regulator valve for setting a control pressure applied to the sensor member, and means for applying opposing forces to a valve member of the pressure-regulating valve with one force being proportional to movement of said one actuating mechanism and the other force being that established by said control pressure applied to said valve member.

8. A hydraulic asymmetry detector as defined in claim 2 wherein said asymmetry-indicating means is a brake.

9. A hydraulic asymmetry detector as defined in claim 8 wherein said asymmetry-indicating means includes a second brake, and means responsive to movement of said sensor member to the other position for operating said second brake.

10. A hydraulic asymmetry detector for detecting relative movement between a pair of actuating mechanisms and operable to set a brake when asymmetry is detected comprising, a pressure-regulator valve for setting a control pressure proportional to movement of one actuating mechanism, a sensor valve having a valve member to which said control pressure is applied to provide a force urging said sensor valve member in one direction, means for urging the sensor valve member in the opposite direction with a force proportional to movement of the other actuating mechanism, said sensor valve having means for controlling setting of said brake, and means for moving said sensor valve member to a brake-setting position when said pressure and spring forces are out of balance.

11. A hydraulic asymmetry detector as defined in claim 10 for setting a pressure-released brake when asymmetry is detected comprising, a fluid brake line from said sensor valve to said brake communicating with one of the fluid lines when the sensor valve member is in said normal position, and said sensor valve having means to connect the fluid brake line to a low pressure return line when the sensor valve member is in the second position.

12. A hydraulic asymmetry detector for detecting unequal movement of a pair of actuating mechanisms comprising: a pressure-regulator valve; a sensor valve; a pair of connected fluid lines extending one to each of said valves for supplying pressure fluid thereto; said pressure-regulator valve having means for setting a control pressure proportional to movement of one actuating mechanism including a valve member, a spring acting on the valve member the force of which varies with movement of said one actuating mechanism, and the control pressure acting on the valve member in opposition to the spring force; said sensor valve having a sensor valve member with a normal position and movable to a second position to connect said fluid lines to a low pressure return line, means for exerting opposing forces on said sensor valve member with one force being proportional to the movement of the other actuating mechanism and the other force being the result of applying said control pressure thereto whereby an imbalance of said last-mentioned forces causes the sensor valve member to move to said second position with loss of pressure fluid in said valves.

13. A hydraulic asymmetry detector as defined in claim 12 for setting a pressure-released brake when asymmetry is detected comprising, a fluid brake line from said pressure-regulator valve to said brake communicating with one of the fluid lines, and said pressure-regulator valve having means operable when asymmetry is detected to connect said fluid brake line to a low pressure return line.

14. A hydraulic asymmetry detector as defined in claim 12 including means operable upon start-up to position said pressure-regulator valve member in a position to set a control pressure and to position said sensor valve member in said normal position comprising, a pair of piston rods associated one with each of the pressure-regulator and sensor valves, a pair of springs associated one with each piston rod for urging the piston rods into engagement with the pressure-regulator valve member and sensor valve member respectively, and a second piston on each piston rod in communication with said fluid lines whereby fluid pressure acts thereon to exert a force on the piston rod in opposition to the force exerted by the associated spring.

* * * * *